United States Patent [19]

Scrabis et al.

[11] Patent Number: 4,711,759
[45] Date of Patent: Dec. 8, 1987

[54] REMOVABLE CRUCIFORM FOR ICE CONDENSER ICE BASKET

[75] Inventors: Charles M. Scrabis, Pittsburgh; Gregory E. Mazza, Bethel Park; Leonard R. Golick, Levelgreen; Paul Pomaibo, North Huntingdon, all of Pa.

[73] Assignee: Westinghouse Electric Corp., Pittsburgh, Pa.

[21] Appl. No.: 827,113

[22] Filed: Feb. 7, 1986

[51] Int. Cl.[4] ............................................. G21C 9/00
[52] U.S. Cl. ................................. 376/284; 376/462; 376/463
[58] Field of Search .................... 248/231.2; 376/283, 376/284, 285, 302, 303, 304, 332, 462, 463

[56] References Cited

U.S. PATENT DOCUMENTS 3,900,367  8/1975  Class ................................... 376/303
4,238,289 12/1980  Weems et al. ....................... 376/283

Primary Examiner—Deborah L. Kyle
Assistant Examiner—Richard W. Wendtland
Attorney, Agent, or Firm—Daniel C. Abeles

[57] ABSTRACT

Removable cruciforms are selectively installed at predetermined, spaced elevations within ice baskets associated with a nuclear power system, each ice basket having a generally cylindrical sidewall with plural, annular retaining rings secured therein at predetermined, spaced elevations, each cruciform being installed at predetermined, axially displaced elevations, engaging a corresponding annular retaining ring. Each cruciform comprises a pair of brackets joined together between parallel base portions by respective support plate assemblies and slide plates in telescoping, sliding relationshp, defining with the base portions, a spring housing of generally square configuration within which a generally C-shaped spring is received. A pair of legs extends integrally from the longitudinal edges of the base portion of each bracket, angularly disposed so as to extend radially within the ice basket. A cruciform is compressible to permit axial translation of the cruciform, while horizontally oriented, through the ice basket. When in position at a desired elevation for installation, the cruciform is released from compression to permit the C-shaped spring to expand and engage the legs of the brackets with the associated retaining ring.

12 Claims, 7 Drawing Figures

REMOVABLE CRUCIFORM FOR ICE CONDENSER ICE BASKET

BACKGROUND OF THE INVENTION

1. Field of the Invention

This invention relates to ice condenser containments, also known as ice baskets, employed for condensing steam generated from the primary water of a nuclear reactor in the event of an accidential loss of coolant and, more particularly, to a removable cruciform which may be employed as a replacement for the original, nonreplaceable cruciforms of conventional ice baskets, or as an original assembly component of an improved ice basket.

2. State of the Relevant Art

Ice condenser containments, also known as ice baskets, are employed with nuclear reactors for condensing the steam from the primary water of the reactor in the event of an accidental loss of coolant. In a typical installation, there are provided approximately 2,000 ice baskets, each of which is approximately one foot in diameter and 48 feet in height and is filled with approximately 1,500 pounds of ice. The sidewalls of the ice basket, substantially cylindrical in configuration, are perforated to permit rapid exposure of the steam to the ice and corresponding, rapid cooling.

Each such ice basket incorporates, at spaced intervals therein, stiffening rings comprising structural elements which provide lateral rigidity and support, to accommodate not only the weight of ice contained therein but also seismic and other disturbances. Conventional ice baskets furthermore include elements known as cruciforms, comprising generally x-shaped metal straps which extend diametrically across the interior of the basket and are welded at the ends of the straps to the interior sidewalls of the basket, typically at or adjacent the stiffening rings. Typically, the cruciforms are formed of $\frac{1}{8}$ inch thick metal, and are $1\frac{1}{2}$ inches in height. Further, typically, seven (7) such cruciforms are assembled within the basket, spaced at approximately six (6) foot vertical intervals. While not structural members of the baskets and thus not necessary to add radial stiffness to the ice basket cross-section, the cruciforms are necessary elements for satisfying various requirements of the ice bed within the basket. For example, cruciforms are necessary to assure that the geometry of the ice bed within the basket is contained during the entire meltout period of a postulated loss of coolant accident. Specifically, as the ice melts upwardly and away from the bottom of the ice baskets, ice contained therein at higher elevations cannot be permitted to fall down into the bottoms of the baskets, since this presents the potential of creating bypass flow routes for the emerging steam which would accompany the loss of coolant. The cruciforms also serve to prevent large masses of ice from falling during seismic disturbances; falling masses of ice could impose unacceptable impact loads on the ice basket and related, underlying supporting structure.

The presence of the cruciforms, however, compounds a maintenance problem which exists in the operation of nuclear power systems employing such ice condenser containments. Particularly, due to sublimation of the ice, the initial volume and weight thereof decreases with time and thus the ice must be replenished, or replaced. A minimum required amount of ice is typically at least 1,200 pounds for each ice basket, for assuring its effectiveness for counteracting the accidental loss of coolant, as above referenced. The cruciforms impose a substantial obstacle to replenishing the supply of ice, as the latter is depleted due to sublimation. For example, the successively lower compartments of the basket, as delineated by the cruciforms, may contain inadequate charges of ice due to sublimation loss, which changes remain spaced apart due to the presence of cruciforms. Thus, while access may be had to the upper, open end of the ice basket for recharging the first and possibly the second upper compartments, the lower compartments are inaccessible, yet may contain an inadequate charge of ice. The ice basket thus loses its required cooling capability, presenting a potentially serious deficiency in its required coolant capacity.

Various solutions have been proposed heretofore to overcome the problems thus presented in the replenishment of the ice in view of the obstacles presented by the cruciforms. One such solution is the removal of the original cruciforms, as permitted in view of their not comprising a structural support element of the basket. A known, replaceable cruciform design exists which has been proposed for installation in place of the previously permanent, but removed, original cruciforms. The replaceable cruciform of known design requires that it be rotated onto its side, effectively reducing its width such that it can be passed downwardly through the ice basket; at the desired elevation for installation, the cruciform then must be rotated back to a horizontal position. Individual, spring-activated locking devices then are released by remote actuation from the top open end of the ice basket, by tools which afford the requisite reaching length into the ice basket, so as to lock the cruciform onto the coupling or stiffening ring within the basket at the corresponding elevation. The known, replaceable cruciform, however, is extremely difficult to install and remove, and is virtually impossible to install at elevations within the ice basket lower than approximately 42 feet from the open top thereof.

Accordingly, there exists a need for a removable cruciform which is readily installed or removed, at every required elevation within the ice basket.

SUMMARY OF THE INVENTION

The present invention provides a removable cruciform which is spring actuated and may be compressed to permit raising or lowering of the cruciform in a horizontal position throughout the height of the ice basket, and then may be released to engage a stiffening ring in the ice basket at a desired elevation, thereby to be temporarily, but securely, structurally locked in position. The configuration of the removable cruciform of the present invention affords an approximately 3 inch diameter central, unobstructed opening, which permits subsequent hole drilling operations throughout the height of the ice basket thereby to facilitate insertion of maintenance tools as are known for use to remove and/or settle ice within the ice basket. Alternatively, the cruciforms of the present invention may be compressed and removed, to afford unimpeded access to the correspondino compartments defined thereby throughout the entire height of the ice basket, for maintenance and related purposes.

The removable cruciform of the present invention is preferably employed in conjunction with the cruciform handling tool of the concurrently filed application of the common coinventors herewith, entitled "HANDLING TOOL FOR, AND METHOD OF USE OF, ICE BASKET REMOVABLE CRUCIFORM," assigned to the common assignee hereof.

The foregoing and other advantages of the removable cruciform of the present invention will be more apparent from the following drawings and detailed description in relation thereto.

DETAILED DESCRIPTION OF THE PREFERRED EMBODIMENT

Figure 1:
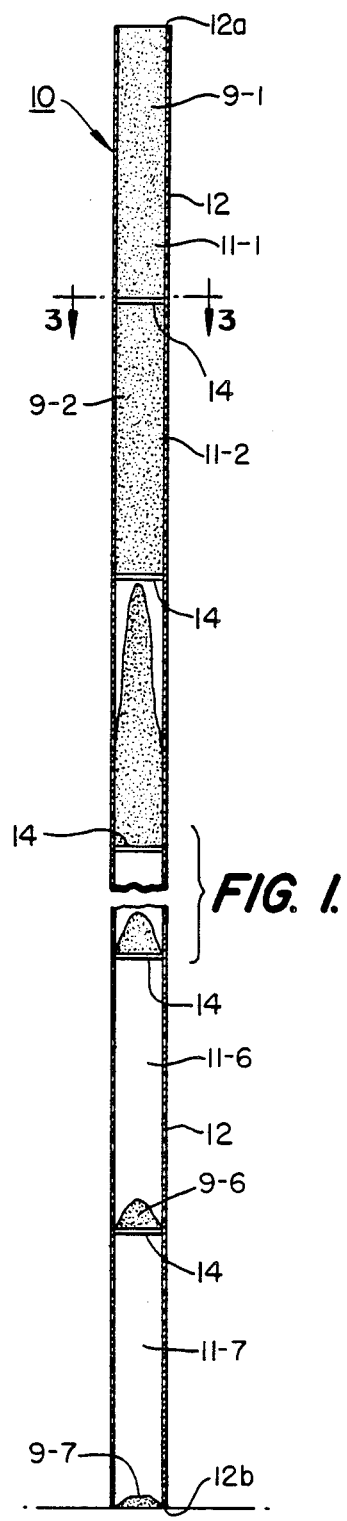
FIG. 1 is an elevational view, in cross-section, of an ice basket having removable cruciforms in accordance with the present invention installed therein, and illustrating a sublimated ice condition.

FIG. 1 is an elevational view, in cross-section, of an ice basket 10 having a cylindrical, perforated metal sidewall and divided into a series of compartments, delineated by removable cruciforms 14 in accordance with the present invention. The open, upper end 12a of ice basket 10 affords limited access to the interior of the basket 10, the lower end 12b typically being enclosed by a grating or meshlike end closure (not shown) which is contiguous with support structure (not shown) for the basket 10. In a typical installation, the removable cruciforms 14 of the invention are disposed at axially displaced positions, or elevations, within the basket 10, corresponding to those of original, welded-in-place cruciforms, and thus are disposed at approximately 6 foot intervals, defining a succession of seven compartments 11-1 through 11-7 delineated by the plurality of cruciforms 14 within the basket 10, each containing initially a full charge of ice.

As described in further detail hereinafter, each of the cruciforms 14 is releasably engaged on a stiffening ring (not seen in FIG. 1) for retaining same in position at the desired elevation within the ice basket 10. The cruciforms 14 are seen to perform the intended function of supporting the charges of ice within the corresponding compartments, despite the fact that sublimation has resulted in reduced charges of ice existing within the lower compartments. For example, whereas the charges of ice 9-1 and 9-2 substantially fill the corresponding compartments 11-1 and 11-2, in the lowermost compartments 11-6 and 11-7, significantly depleted charges of ice 9-6 and 9-7, respectively, remain. Whereas removal of the charge of ice at the uppermost compartment 11-1 is feasible with conventional tools since accessible through the open upper end 12a, removal of ice from the successively lower compartments is a difficult task. A preferred instrument which enables efficient and effective removal of ice from each of the successive compartments throughout the entire height of the basket 10 is disclosed in the copending application entitled "Ice Remover Auger for Ice Condention Containment", the inventors of which are coinventors herein, the application furthermore being assigned to the common assignee hereof.

It thus will be understood that as the ice in each successive, lower compartment is removed, access may be gained to the corresponding removable cruciform 14 of the invention, and the same may be retracted and withdrawn, compartment by compartment, thereby to gain access to the lowermost compartment 11-7. The ice basket 10 may then be recharged with ice and the cruciforms 14 reinstalled, in compartment by compartment order. The cruciforms 14 of the invention, however, also accomodate alternative techniques and related equipment for accomplishing these same purposes, as later described herein.

It furthermore should be understood that, where possible, removable cruciforms 14 in accordance with the present invention may be employed initially in a new installation, and not merely as a replacement for the conventional welded-in-place cruciforms of prior ice baskets, subsequently to their removal. However, where the removable cruciforms are to be employed in existing ice baskets as a replacement for the welded-in-place, conventional cruciforms, the latter must first be removed. Equipment for performing that function is disclosed in the copending application entitled "Ice Basket Cruciform Removal Tool", the inventor of which is a coinventor herein, the application being assigned to the common assignee hereof.

Figure 2:
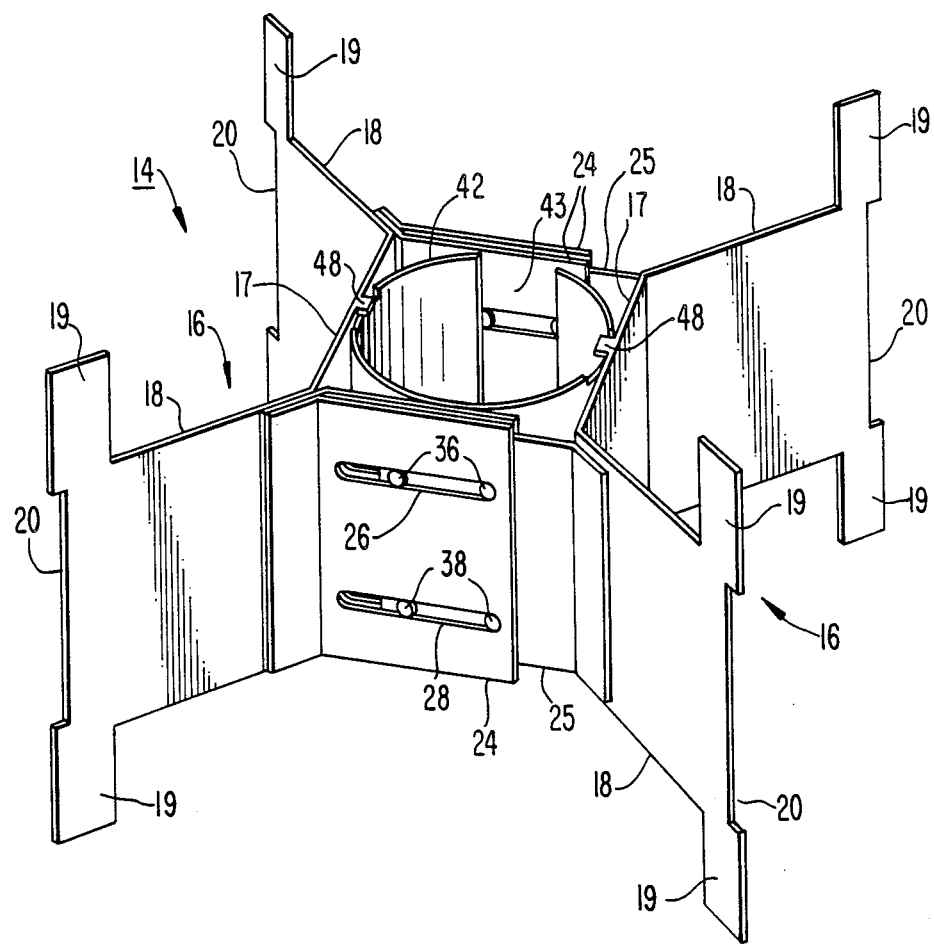
FIG. 2 is an elevational, perspective view of the removable cruciform insert of the present invention.
Figure 3:
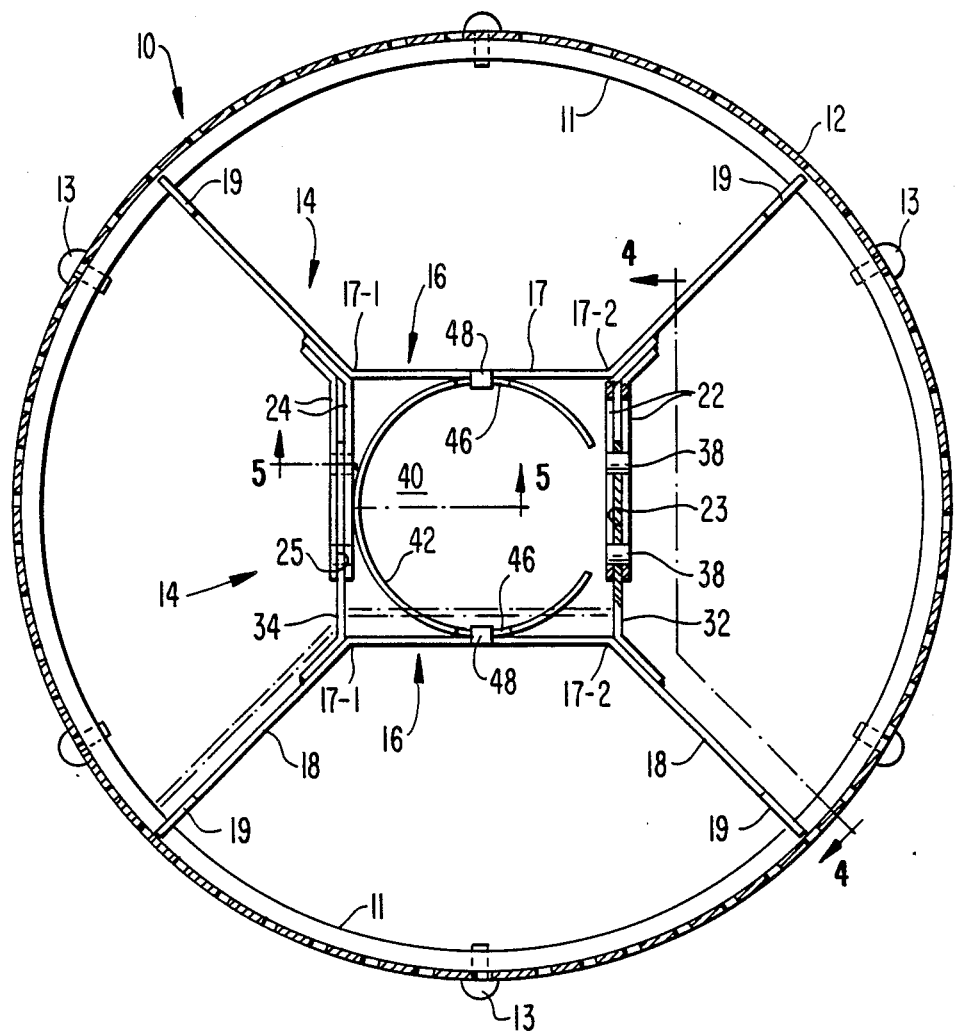
FIG. 3 is a plan view, taken in cross-section along a plane through line 3—3 in FIG. 1, illustrating the cruciform of the invention as installed within an ice basket, engaging a stiffening ring therein.

The cruciform 14 of the present invention is shown in detail in the perspective, elevational view of FIG. 2 and, as assembled within an ice basket 10, in the plan view of FIG. 3, taken generally along the cross-sectional view line 3—3 in FIG. 1. Further details of the cruciform 14 of the invention are set forth in the side elevational view of FIG. 4, partly in cross-section and taken generally along the line 4—4 in FIG. 3, but wherein the sidewall 12 of the ice basket has been removed for simplicity and clarity of illustration. Additionally, the elevational view of FIG. 5 comprising a partial cross-section, taken along line 5—5 in FIG. 3, illustrates details of the internal construction of the cruciform 14.

Figure 4:
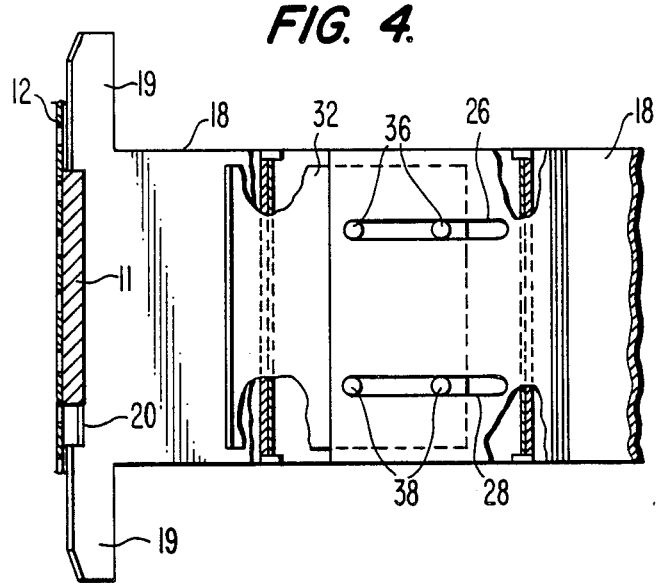
FIG. 4 is a side elevational view of a portion of the removable cruciform of the present invention, as engaged on a stiffening ring, taken along line 4—4 in FIG. 3, with the cylindrical sidewall structure of the ice basket removed for ease and clarity of illustration.

With concurrent reference to FIGS. 2, 3 and 4, the removable cruciform 14 in accordance with the present invention comprises a pair of brackets 16, each of a generally V-shaped, truncated base configuration. Each bracket 16 comprises a central, base portion 17 having parallel longitudinal edges 17-1 and 17-2 from which corresponding integral legs 18 extend at a predetermined angle, so as to assume generally radial orientations relative to the sidewall 12 of an ice basket 10 in which the cruciform 14 is installed, as best seen in FIG. 3. Each of the legs 18 carries a pair of integral, upper and lower feet 19 which extend radially beyond the outer longitudinal edge of the corresponding leg 18 and define a receiving channel 20 therebetween. A pair of supoort plate assemblies 22 and 24, respectively comprising parallel, spaced plates 22a, 22b, and 24a, 24b, defining corresponding slide channels 23 and 25 therebetween, are secured to and extend in parallel relationship from one of the brackets 16, at right angles to the central portion 17 thereof. As best seen in FIG. 4, a pair of parallel, horizontal slots 26 and 28 are formed so as to extend, in alignment, through each of the parallel support plates 22a, 22b and 24a, 24b.

On the other of the brackets 16 there are secured a pair of slide support plates 32 and 34, affixed thereto so as to extend at right angles from the central portion 17 in parallel relationship, and spaced apart so as to be received in telescoping, sliding relationship in the corresponding slide channels 23 and 25 of the support plate assemblies 22 and 24. Each of the slide support plates 32 and 34 has secured thereto corresponding pin pairs 36 and 38, at positions aligned with, and for being received through, the slots 26 and 28, respectively, in the mating support plate assemblies 22 and 24, to restrict, or limit, the telescoping, sliding relationship to a direction parallel to the slots 26 and 28, and a length of travel as defined by the abutment of the pin pairs 36 and 38 with the corresponding, opposite ends of the slots 26 and 28. As can be best appreciated from FIG. 3, the pair of brackets 16 accordingly may be compressed and/or expanded with a limited length of travel along a diameter of the ice basket 10 passing perpendicularly through the respective central portions 17 thereof, and corresponding to a symmetrically disposed, compression/expansion axis of the cruciform 14.

As best seen in FIG. 4, the slide support plates 32 and 34 are slightly shorter in axial height (i.e., along the vertical axis of the cruciform 14, corresponding to the vertical axis of the cylindrical basket 10) than the corresponding support plates 22a, 22b and 24a, 24b. For example, support plates 22a, 22b and 24a, 24b, may each be approximately 4 inches in axial height whereas the slide support plates 32 and 34 may be of approximately 3.62 inches in axial height. The V-shaped brackets 16 as well may be of approximately 4 inches in axial height.

The central portions 17 of the respective brackets 16 and the telescopingly engaged support plate assemblies and slide support plates 22, 32, and 24, 34, define therewithin a spring housing 40 which is of nominally square cross-section but, as described, may be compressed or expanded within a limited extent of travel along an axis perpendicular to the parallel, central portions 17. A C-shaped spring 42 is received in the housing 40. With concurrent reference to FIGS. 3 to 7, the spring 42 defines a longitudinal, or axially extending opening 43 between its free ends 42a and 42b; while illustrated in FIG. 7 as of circular cross-sectional configuration, corresponding to its installed condition in FIG. 3, the spring 42 in a free configuration (i.e., when not disposed within the housing 40) assumes a normal, expanded configuration. Accordingly, the spring 42 engages the base portions of the brackets 16 and applies a resilient biasing force thereto for maintaining the spaced relationship thereof and the nominally square cross-section configuration of the housing 40, the pins 36 and 38 abutting the ends of the slots 26 and 28.

Figure 5:
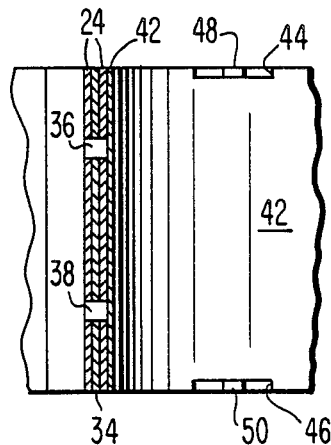
FIG. 5 is an elevational and partial cross-sectional view, taken along line 5—5 in FIG. 3.
Figure 6:
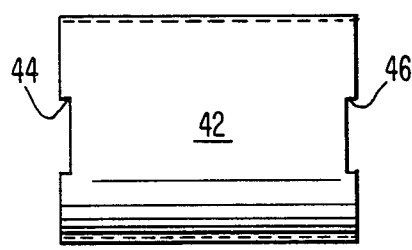
FIGS. 6 and 7 are side elevational and plan views, respectively, of the C-shaped compressible spring employed in the removable cruciform of the present invention.
Figure 7:
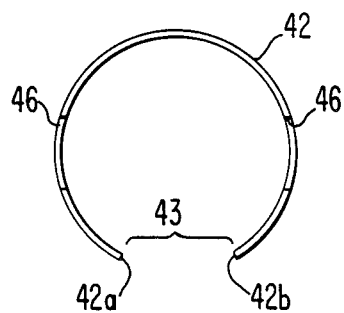

Pairs of notches 44 and 46 are formed in the spring 42 at its opposite ends, each pair preferably being symmetrically disposed about a diameter which, as seen in FIG. 7, extends transversely to a diameter passing symmetrically through the opening 43. Pairs of tabs 48 and 50, as seen in FIGS. 3 and 5, are formed on the upper and lower edges of the central portions 17 of both brackets 16 and extend laterally and thus radially inwardly, so as to be received in the corresponding, aligned notches 44 and 46 of the spring 42.

The cylindrical sidewall 12 of the ice basket 10 has rigidly secured therein, at spaced elevations, a plurality of stiffening rings 11. A single such stiffening ring 11 is illustrated in FIGS. 3 and 4, which may be welded in place and/or secured to the sidewall 12 by screws 13.

In use of the replaceable cruciform 14 of the invention, the brackets 16 are moved together by compressing the spring 42, as before described, thus effectively retracting the radially extending legs 18. In a specific embodiment of the cruciform, the retraction or compression reduces the effective diameter of the circumferential periphery of the legs and associated feet extensions from 11.90" (as installed and engaged within the basket 10) to 11.50". This permits lowering the cruciform 14, in a horizontal orientation, axially downwardly through the ice basket 10 to a desired elevation in alignment with a stiffening ring 11. The cruciform 14 is then released from compression while supported at the desired elevation, the C-spring 42 causing the cruciform 14 to expand, advancing the legs 18 toward the sidewall 12 of the ice basket 10 so as to receive the stiffening ring 11 in the channels 20 intermediate the feet 19 of each leg 18.

Suitable apparatus for effecting the compression of the bracket 14 and its axial, elevational positioning for installation in an engaged position with a stiffening ring 11, as well as for subsequent removal thereof, as described in the foregoing and illustrated in FIGS. 3 and 4, is disclosed in the concurrently filed and copending application entitled "Handling Tool for, and Method of Use of Ice Basket Removable Cruciform" of the common coinventors herewith and assigned to the common assignee hereof.

The removable cruciform 14 of the oresent invention thus satisfies the requirement of being readily manipulated, both for installation into and removal from required elevations within an ice basket, for the purposes hereinbefore set forth. The configuration of the cruciform 14, moreover, is particularly advantageous, taking into account the maintenance functions required to be performed with respect to ice baskets of the type herein considered. Particularly, the cruciform 14 affords equivalent ice charge support functions, as those of the fixed, or welded-in-place, cruciforms of the prior art and, in fact, improves the support function in view of the generally square configuration of the spring housing 40, as compared to the relatively more simple, X-shaped configuration of the metal straps of the prior art cruciforms. Significantly, moreover, the mating configuration of the C-shape spring 42, as disposed within the housing 40, affords a central, axially aligned passage throughout the height of a given ice basket 10. Specifically, the spring 42, of approximately 3 inches in diameter for the embodiment as illustrated, when used with an ice basket of approximately one (1) foot diameter, affords a convenient central passageway or column, passing through the geometric center of the ice basket 10 throughout its height, to permit thermal drilling operations to provide an axially extending, central hole throughout the height of the ice basket through which maintenance tools may be inserted to remove and settle ice.

The removable cruciform of the present invention thus will be seen to be highly effective and practical, not only as to its installation and removal and in performing its intended function as installed but also in facilitating certain maintenance operations and accommodating equipment employed for that purpose, yet is of relatively simple construction affording the benefits of ease and low cost of manufacture. Numerous modifications and adaptations of the removable cruciform insert of the present invention will be apparent to those of skill in the art and thus it is intended by the appended claims to cover all such modifications and adaptations which fall within the true spirit and scope of the invention.

We claim as our invention:

1. A removable cruciform for use in an ice basket having a generally cylindrical sidewall defining a central, vertical axis of the ice basket and plural, generally annular retaining rings secured to the interior of the cylindrical sidewall of the ice basket at predetermined, spaced elevations throughout the axial height of the ice basket, comprising:
   a pair of brackets, each comprising a central, base portion having parallel longitudinal edges and a pair of integral legs extending at corresponding angles relative to said base portion from the respective parallel longitudinal edges thereof;
   a pair of support plate assemblies secured to and extending in parallel, spaced relationship from one of said pair of brackets, generally perpendicular to said base portion thereof, each said support plate assembly defining a corresponding slide channel;
   a pair of slide support plates secured to the other of said pair of brackets and extending therefrom in spaced, parallel relationship, and received in telescoping, sliding relationship in the corresponding slide channels of the pair of respective support plate assemblies of said one of said brackets thereby to dispose said base portions of said pair of brackets in parallel, spaced relationship and defining therewith a housing of nominally, generally square configuration; and
   spring means received within said housing and engaging said base portions of said brackets and applying a resilient biasing force thereto for maintaining said spaced relationship thereof.

2. A removable cruciform as recited in claim 1, wherein said spring means comprises a longitudinally extending spring of generally C-shaped cross-section and having an axial height corresponding generally to the longitudinal height of said base portions of said pair of brackets.

3. A removable cruciform as recited in claim 2, wherein:
   said C-shaped spring is received within said housing of said cruciform in symmetrically disposed relationship relative to said base portions of said brackets, and further comprises a pair of notches in the upper and lower circumferential edges thereof at positions contiguous to the upper and lower lateral edges of said base portions of said brackets; and
   each of said base portions of said brackets further comprises a tab extending from a central portion of each of the upper and lower edges thereof, laterally inwardly with respect to said housing and received in the respectively corresponding notches of the upper and lower circumferential edges of said C-shaped spring.

4. A removable cruciform as recited in claim 1, wherein there is further provided:
   first and second parallel slots in each of said support plate assemblies, extending in respective, vertically displaced, laterally oriented relationship; and
   first and second vertically displaced pairs of pins in each of said slide support plates respectively corresponding to said first and second parallel slots and disposed therein in corresponding, laterally oriented, displaced positions, and received in the respective said first and second slots of the respective support plate assemblies to align the respective said slide support plates and support plate assemblies and permit limited, telescoping and sliding engagement thereof.

5. A removable cruciform as recited in claim 1, wherein:
   said integral legs of each of said pair of brackets extend from said corresponding, central base portions at said corresponding angular relationship so as to be radially oriented relative to the cylindrical sidewall of an ice basket within which the cruciform is positioned in generally horizontal orientation; and
   each of said integral legs of said brackets includes means thereon for engaging a corresponding retaining ring of the ice basket when the cruciform is disposed at a corresponding, predetermined elevation at which the ring is secured to the interior sidewall of the ice basket.

6. A removable cruciform as recited in claim 5, wherein said engaging means comprise a pair of spaced feet extending integrally from the free longitudinal edge of the corresponding said leg and spaced apart so as to define therebetween a receiving channel at the free longitudinal edge of the corresponding said leg for engaging therein the annular retaining ring.

7. A nuclear reactor system having an array of ice baskets disposed thereabout, each said ice basket having a generally cylindrical sidewall and plural, annular retaining rings secured to the interior surface of the sidewall at predetermined, spaced elevations throughout the axial height of the ice basket, removable cruciforms being mounted within said ice basket at predetermined, spaced elevations therewithin displaced from the open, upper end of the ice basket and defining therewithin corresponding compartments, each to be charged with ice, each said removable cruciform, when so mounted, engaging a corresponding, annular retaining ring for supporting a charge of ice received in the corresponding compartment thereabove, and comprising:
   a pair of brackets, each comprising a central, base portion having parallel longitudinal edges and a pair of integral legs extending at corresponding angles relative to said base portion from the respective parallel longitudinal edges thereof;
   a pair of support plate assemblies secured to and extending in parallel, spaced relationship from one of said pair of brackets, generally perpendicular to said base portion thereof, each said support plate assembly defining a corresponding slide channel;
   a pair of slide support plates secured to the other of said pair of brackets and extending therefrom in spaced, parallel relationship, and received in telescoping, sliding relationship in the corresponding slide channels of the pair of respective support plate assemblies of said one of said brackets thereby to dispose said base portions of said pair of brackets in parallel, spaced relationship and define therewith a housing of nominally, generally square configuration; and
   spring means received within said housing and engaging said base portions of said brackets and applying a resilient force thereto for maintaining said spaced relationship thereof.

8. A nuclear reactor system as recited in claim 7, wherein said spring means comprises a longitudinally extending spring of generally C-shaped cross-section and having an axial height corresponding generally to the longitudinal height of said base portions of said pair of brackets.

9. A nuclear reactor system as recited in claim 8, wherein:
   said C-shaped spring is received within said housing of said cruciform in symmetrically disposed relationship relative to said base portions of said brackets, and further comprises a pair of notches in the upper and lower circumferential edges thereof at positions contiguous to the upper and lower lateral edges of said base portions of said brackets; and
   each of said base portions of said brackets further comprises a tab extending from a central portion of each of the upper and lower edges thereof, laterally, inwardly with respect to said housing and received in the respectively corresponding notches of the upper and lower circumferential edges of said C-shaped spring.

10. A nuclear reactor system as recited in claim 7, wherein there is further provided:
   first and second parallel slots in each of said support plate assemblies, extending in respective vertically displaced, laterally oriented relationship; and
   first and second vertically displaced pairs of pins in each of said slide support plates respectively corresponding to said first and second parallel slots and disposed therein in corresponding, laterally displaced positions, for being received in the respective said first and second slots of the respective support plate assemblies to align the respective said slide support plates and support plate assemblies and permit limited, telescoping and sliding engagement thereof.

11. A nuclear reactor system as recited in claim 7, wherein:
   said integral legs of each of said pair of brackets extend from said corresponding, central base portions at said corresponding angular relationship so as to be radially oriented relative to the cylindrical sidewall of an ice basket within which the cruciform is positioned in generally horizontal orientation; and
   each of said integral legs of said brackets includes means thereon for engaging a corresponding retaining ring of the ice basket when the cruciform is disposed at a corresponding, predetermined elevation at which the ring is secure to the interior sidewall of the ice basket.

12. A nuclear reactor system as recited in claim 6, wherein said engaging means comprise a pair of spaced feet extending integrally from the free longitudinal edge of the corresponding said leg and spaced apart so as to define therebetween a receiving channel at the free longitudinal edge of the corresponding said leg for engaging therein the annular retaining ring.

* * * * *